(12) United States Patent
Kawakita (10) Patent No.: US 12,397,531 B2
(45) Date of Patent: *Aug. 26, 2025

(54) PACKAGING MATERIAL

(71) Applicant: Resonac Packaging Corporation, Hikone (JP)

(72) Inventor: Keitaro Kawakita, Hikone (JP)

(73) Assignee: Resonac Packaging Corporation, Hikone (JP)

( * ) Notice: Subject to any disclaimer, the term of this patent is extended or adjusted under 35 U.S.C. 154(b) by 281 days.

This patent is subject to a terminal disclaimer.

(21) Appl. No.: 18/133,439

(22) Filed: Apr. 11, 2023

(65) Prior Publication Data

US 2023/0321952 A1 Oct. 12, 2023

(30) Foreign Application Priority Data

Apr. 12, 2022 (JP) ................................. 2022-065615
Mar. 9, 2023 (JP) ................................. 2023-036561

(51) Int. Cl.
*B32B 15/08* (2006.01)
*B32B 7/12* (2006.01)
*B32B 37/12* (2006.01)

(52) U.S. Cl.
CPC ................ *B32B 15/08* (2013.01); *B32B 7/12* (2013.01); *B32B 37/12* (2013.01);
(Continued)

(58) Field of Classification Search
None
See application file for complete search history.

(56) References Cited

U.S. PATENT DOCUMENTS

| 2012/0135301 A1* | 5/2012 | Akita | H01G 4/224 |
| | | | 429/185 |
| 2014/0242333 A1* | 8/2014 | Oono | B32B 27/34 |
| | | | 428/141 |

(Continued)

FOREIGN PATENT DOCUMENTS

| CN | 107170915 A | * 9/2017 | ........... B32B 15/088 |
| JP | 2011-054563 | 3/2011 | |

(Continued)

OTHER PUBLICATIONS

Fu—CN 107170915 A—MT—battery package w-pigment amount in adhesive—2017 (Year: 2017).*
Takada—JP 2015-166261 A—MT—molding packag—2015 (Year: 2015).*

*Primary Examiner* — John Vincent Lawler
(74) *Attorney, Agent, or Firm* — MORI & WARD, LLP (57) ABSTRACT

A packaging material includes a substrate layer, a metal foil layer laminated on an inner side of the substrate layer, a sealant layer made of a thermoplastic resin and laminated on an inside of the metal foil layer, and a colored adhesive layer provided between the metal foil layer and the substrate layer. The substrate layer is 2.0 to 5.0% in MD and TD hot water shrinkages, 1.5% or less in a difference between the MD and TD hot water shrinkages, 1.5 to 3 GPa both in MD and TD elastic modulus. The colored adhesive layer is made of a colored adhesive composition containing a color pigment and an adhesive. The colored adhesive layer is composed of a colored adhesive composition of 5 to 10 $g/m^2$ and contains the color pigment of 0.25 to 0.49 $g/m^2$.

10 Claims, 5 Drawing Sheets

(52) U.S. Cl.
CPC ... *B32B 2037/1253* (2013.01); *B32B 2250/02* (2013.01); *B32B 2255/06* (2013.01); *B32B 2457/10* (2013.01)

(56) References Cited

U.S. PATENT DOCUMENTS

| | | | | |
|---|---|---|---|---|
| 2016/0248054 A1* | 8/2016 | Muroi | ............... | B32B 15/18 |
| 2018/0040861 A1* | 2/2018 | Akita | ............... | H01G 4/224 |
| 2023/0187743 A1* | 6/2023 | Cheng | ............... | C22C 21/00 |
| | | | | 429/163 |

FOREIGN PATENT DOCUMENTS

| | | | | |
|---|---|---|---|---|
| JP | 2011-096552 | | 5/2011 | |
| JP | 2015166261 A | * | 9/2015 | ............. B32B 15/09 |
| WO | WO 2011/016506 | | 2/2011 | |

\* cited by examiner

PACKAGING MATERIAL

The present invention relates to a packaging material as an exterior material for a battery (power storage device), such as, e.g., a secondary battery (lithium-ion secondary battery) for notebook computers and mobile phones, or an on-board (mobile) or stationary secondary battery (lithium-ion secondary battery). It also relates to a packaging material or a packaging container for foods or pharmaceuticals goods, and a power storage device.

BACKGROUND OF THE INVENTION

A battery, such as, e.g., a lithium-ion secondary battery, is often required to be colored to unify the appearance and the color of a device, such as, e.g., an electric device to which the battery is mounted. In particular, in order to impart a profound feeling and a luxury feeling, the device is often made black, and in this case, the battery is also often made black.

As a packaging material for this type of device, it is common to use a laminate in which a resin layer is laminated on both sides of a metal foil. For coloring a battery in black or the like, there are, for example, a means for coloring a resin layer used in a packaging material, a means for providing a print layer below a substrate layer, a means for coloring an adhesive layer provided between a substrate layer and a metal layer, and a means for coloring an adhesive layer between layers in a case where a substrate layer is formed of a plurality of layers.

For example, there is a packaging material in which a layer including an identification label is provided as any one of a substrate layer (resin layer), an adhesive layer, and a metal foil layer of a battery packaging material. There also is a packaging material in which a print layer provided on a lower side of a substrate layer or an adhesive layer provided on a lower side of a substrate layer is colored to color the entire packaging material (see Patent Documents 1 or 2).

Further, there is a battery packaging material having a black body material layer between a metal foil layer and an outer layer to promote the heat dissipation of the battery packaging material (see Patent Document 3).

PRIOR ART DOCUMENT

Patent Document

Patent Document 1: International Publication WO 2011/016506 A1
Patent Document 2: Japanese Unexamined Patent Application Publication No. 2011-054563
Patent Document 3: Japanese Unexamined Patent Application Publication No. 2011-096552

Problems to be Solved by the Invention

Conventionally, in the case of coloring the above-described packaging material black, it is common to provide a print layer using a printing ink containing a pigment, such as, e.g., carbon black.

However, in a case where a print layer containing carbon black as a pigment is provided on an inner surface of an outer resin layer constituting a battery packaging material to make the battery black, there are the following problems.

That is, when molding the black packaging material into a shape of a molded container (molded casing) as a molded product by deep drawing or stretch forming, the carbon black-containing print layer partially cracks and is peeled off, and the underlayer which is not black is exposed and visually recognized. This impairs the uniformity of black.

Such partial delamination of the print layer occurs when sealing a black packaging material after encapsulating an electrode or an electrolyte, or when using a battery packaged with a black packaging material under severe environments, such as, e.g., a high-temperature and high-humidity environment.

Further, not only a black packaging material colored with carbon black but also a packaging material colored with other pigments have similar problems, and it was difficult to obtain good coloring.

On the other hand, in recent years, a battery, such as, e.g., a lithium-ion secondary battery, is being increased in capacity. A packaging material as a battery packaging material is increasingly required to have excellent properties, such as, e.g., moldability, heat resistance, and moisture resistance. The heat-resistant resin layer (substrate layer) provided on an outer side of a battery packaging material is also desired to efficiently disperse the external force at the time of molding and to maintain sufficient strength.

Preferred embodiments of the present invention have been made in view of the above-described and/or other problems in the related art. Preferred embodiments of the present invention can significantly improve upon existing methods and/or devices.

The present invention has been made in view of the above-described problems, and an object of the present invention is to provide a packaging material excellent in moldability, coloring, and strength, and a packaging container using the packaging material, a power storage device packaging material, and a power storage device.

Other objects and advantages of the present invention will be apparent from the following preferred embodiments.

Means for Solving the Problems

In order to solve the above-described problems, the present invention includes the following means.

[1] A packaging material including:
a substrate layer made of a heat-resistant resin;
a metal foil layer laminated on an inner side of the substrate layer;
a sealant layer made of a thermoplastic resin, the sealant layer being laminated on an inner side of the metal foil layer; and
a colored adhesive layer provided between the metal foil layer and the substrate layer,
wherein the substrate layer is 2.0% to 5.0% in a hot water shrinkage both in a machine direction (MD) and in a transverse direction (TD) perpendicular to the machine direction,
wherein the substrate layer is 1.5% or less in a difference between the hot water shrinkage in the machine direction (MD) and the hot water shrinkage in the transverse direction (TD),
wherein the substrate layer is 1.5 GPa to 3 GPa both in an elastic modulus in the machine direction (MD) and in an elastic modulus in the transverse direction (TD),
wherein the colored adhesive layer is composed of a colored adhesive composition containing a color pigment and an adhesive,
wherein the colored adhesive layer is composed of the colored adhesive composition of 5 g/m$^2$ to 10 g/m$^2$, and
wherein the colored adhesive layer contains the color pigment of 0.25 g/m$^2$ to 0.49 g/m$^2$.

[2] The packaging material as recited in the above-described Item [1],
wherein the colored adhesive layer contains a two-part curing type polyester urethane resin composed of a polyester resin as a main agent and a polyfunctional isocyanate compound as a curing agent,
wherein the polyester resin as the main agent is 8,000 to 25,000 in a number average molecular weight (Mn), 15,000 to 50,000 in a weight average molecular weight (Mw), and 1.3 to 2.5 in a ratio thereof (Mw/Mn),
wherein the polyfunctional isocyanate compound as the curing agent contains 50 mole % or more of aromatic isocyanate, and
wherein the substrate layer is constituted by a polyamide film having a number average molecular weight of 15,000 to 30,000.

[3] The packaging material as recited in the above-described Item [2],
wherein in the two-part curing type polyester urethane resin, the polyester resin as the main agent is made of dicarboxylic acid and dialcohol as raw materials, and
wherein the dicarboxylic acid includes aliphatic dicarboxylic acid whose methylene number of methylene chain is an even number and aromatic dicarboxylic acid, and a content rate of the aromatic dicarboxylic acid to a total amount of the aliphatic dicarboxylic acid and the aromatic dicarboxylic acid is 40 mole % to 80 mole %.

[4] The packaging material as recited in the above-described Item [2] or [3],
wherein a cured film of the two-part curing type polyester urethane resin is 70 MPa to 400 MPa in a Young's modulus by a tensile test according to JIS K7162.

[5] The packaging material as recited in any one of the above-described Items [1] to [4],
wherein the metal foil layer has a chemical conversion coating film on at least one surface thereof.

[6] The packaging material as recited in any one of the above-described Items [1] to [5], further comprising:
a matte coat layer provided on an outer surface of the substrate layer.

[7] The packaging material as recited in any one of the above-described Items [1] to [6],
wherein the substrate layer is 320 MPa or more in at least one of breaking strength in the machine direction (MD) and breaking strength in the transverse direction (TD).

[8] A packaging container comprising:
the packaging material as recited in in any one of the above-described Items [1] to [7],
wherein the packaging material includes a molded portion formed by deep drawing or stretch forming.

[9] A power storage device packaging material formed of the packaging material as recited in any one of the above-described Items [1] to [7].

[10] A power storage device comprising:
a power storage device main body; and
the packaging material as recited in above-described Item [9],
wherein the power storage device main body is packaged with the packaging material.

Effects of the Invention

According to the packaging material as recited in the above-described Item [1], since the colored adhesive layer contains a pigment, good coloring can be achieved. Further, since the hot water shrinkage and the elastic modulus of the substrate layer in the machine direction (MD) and the transverse direction (TD) are specified to fall within the predetermined ranges, it is possible to efficiently disperse the action from the external pressure, which makes it possible to obtain enough strength and excellent moldability. Further, the application quantity of the colored adhesive layer and the content of the color pigment are specified in the predetermined ranges. Therefore, it is possible to obtain uniform colorability as a whole, prevent the colored adhesive layer from being weakened due to the inclusion of the color pigment, and sufficiently maintain the adhesive properties between the substrate layer and the metal foil layer.

This enables sharp and deep molding and prevents defects, such as, e.g., partial cracking and peeling of the colored adhesive layer during molding and sealing or even during the use in a hot-temperature and high-humidity severe environment. Moreover, even in the case of performing a hot water submersion test, which is the most severe environmental test, the substrate layer does not peel off, and the bonding properties of the. substrate layer can be further improved.

According to the packaging material as recited in the above-described Item [2], since the colored adhesive layer contains a particular two-part curing type polyester urethane resin, it is possible to obtain moderate strength and elongation, and excellent heat resistance. Further, the polyester resin, which is a main agent of the colored adhesive layer, is adjusted to a predetermined molecular weight distribution, and therefore, it is excellent in adhesive coating suitability. Further, since the polyamide film as a substrate layer is adjusted to the predetermined molecular weight distribution, the film as a substrate layer hardly torn, and good puncture resistance can be obtained.

According to the packaging material as recited in the above-described Item [3], the polyester resin as a main agent is composed of the specific composition in the two-part curing type polyester urethane resin contained in the colored adhesive layer. Therefore, the adhesive properties can be further enhanced, which in turn can more assuredly prevent the delamination between the substrate layer and the metal foil layer.

According to the packaging material as recited in the above-described Item [4], the Young's modulus in the cured film made of the two-part curing type polyester urethane resin contained in the colored adhesive layer is adjusted. Therefore, appropriate flexibility and coating film strength can be maintained, which in turn can more assuredly prevent the delamination between the substrate layer and the metal foil layer.

According to the packaging material as recited in the above-described Item [5], a chemical conversion coating film is provided on a surface of the metal foil layer. Therefore, it is possible to prevent the corrosion of the metal foil layer, which in turn can improve the corrosion resistance of the entire packaging material.

According to the packaging material as recited in the above-described Item [6], since a matte coat layer is provided on the surface of the substrate layer, the moldability and the durability of the packaging material can be further improved. Further, the presence of the matte coat layer improves the appearance quality of the packaging material and prevents trouble, such as, e.g., the blocking between the packaging materials, and facilitate the handling of the packaged product.

According to the packaging material as recited in the above-described Item [7], since the breaking strength is specified within the predetermined range, strength can be further improved.

According to the packaging container as recited in the above-described Item [8], since the packaging material of the above-described invention is used, the same advantages as those described above can be obtained.

According to the power storage device packaging material as recited in the above-described Item [9], since the packaging material and the packaging container of the present invention are used, the same effects as those described above can be obtained.

According to the power storage device as recited in the above-described Item [10], since the packaging material of the present invention is used, the same effects as those described above can be obtained.

EMBODIMENTS FOR CARRYING OUT THE INVENTION

Figure 1:
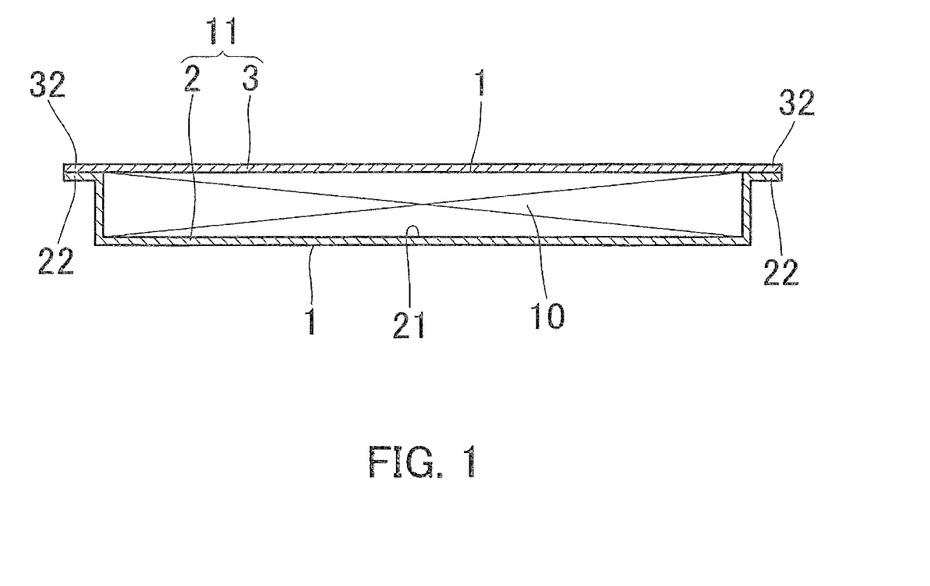
FIG. 1 is a cross-sectional side view showing a power storage device according to one embodiment of the present intention.
Figure 2:
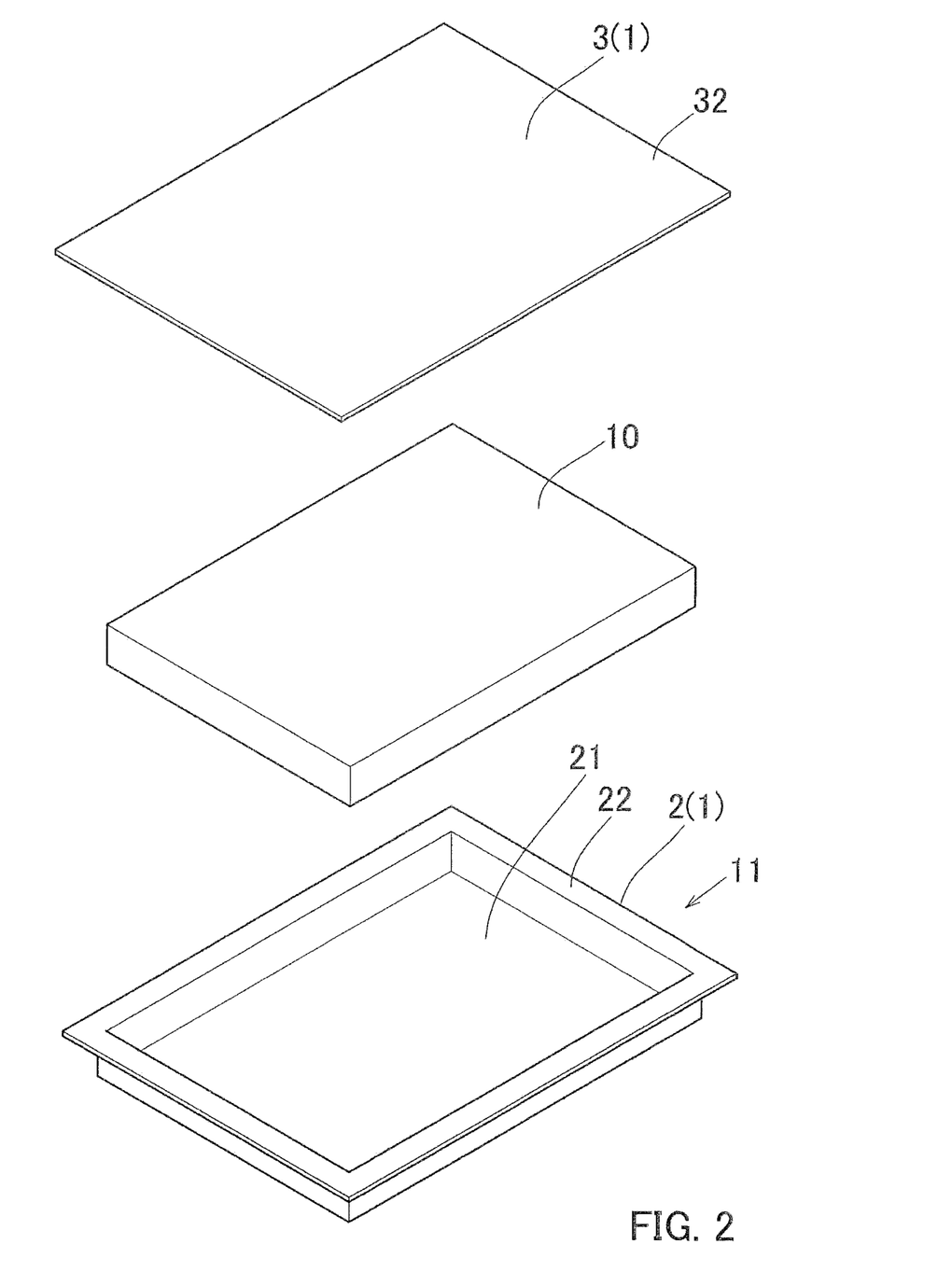
FIG. 2 is an exploded perspective view showing a power storage device according to one embodiment of the present invention.

FIG. 1 is a cross-sectional side view showing a power storage device according to one embodiment of the present invention. FIG. 2 is a perspective view showing a power storage device according to one embodiment of the present invention in an exploded manner.

As shown in FIG. 1 and FIG. 2, the power storage device of this embodiment is provided with a casing 11 and a power storage device main body 10, such as, e.g., an electrochemical element to be housed in the casing 11.

The casing 11 is constituted by a tray member (packaging container) 2 having a rectangular shape in plan view, the tray member being formed by an exterior material 1, and a cover member 3 having a sheet-like shape in plan view, the cover member being formed by the exterior material (packaging material) 1.

The tray member 2 is formed of a molded article obtained by molding a packaging material 1 using a method, such as, e.g., deep drawing. In the tray member 2, the entire intermediate region except for the outer peripheral edge portion is recessed downward to form a recessed portion 21 having a rectangular shape in plan view, and an outwardly protruded flange portion 22 is integrally formed on the outer periphery of the opening edge portion of the recessed portion 21.

Further, the cover member 3 is constituted by a packaging material 1 formed in a sheet-like shape. In the cover member 3, the outer peripheral edge portion serves a flange portion 32 corresponding to the flange portion 22 of the tray member 2.

The packaging materials 1 as the tray member 2 and the cover member 3 are each constituted by an outer packaging laminate, which is a laminate sheet or film with softness and flexibility.

The power storage device main body 10 is not particularly limited, and the examples thereof include a battery main body, a capacitor main body, or the like. The power storage device main body 10 is formed into a shape corresponding to the recessed portion 21 of the tray member 2.

Then, a power storage device main body 10 is housed in the recessed portion 21, and a cover member 3 is arranged on the tray member 2 to cover the recessed portion 21. In this state, the flange portions 22 and 32 of the tray member 2 and the cover member 3 are thermally fused to each other. Thus, a power storage device of this embodiment is formed.

Although not shown, one end (inner end) of a tab lead is connected to the power storage device main body 10, and the other end (outer end) thereof is drawn out of the power storage device. Thus, electric power can be input to and output from the power storage device main body 10 via the tab-lead.

Figure 3:
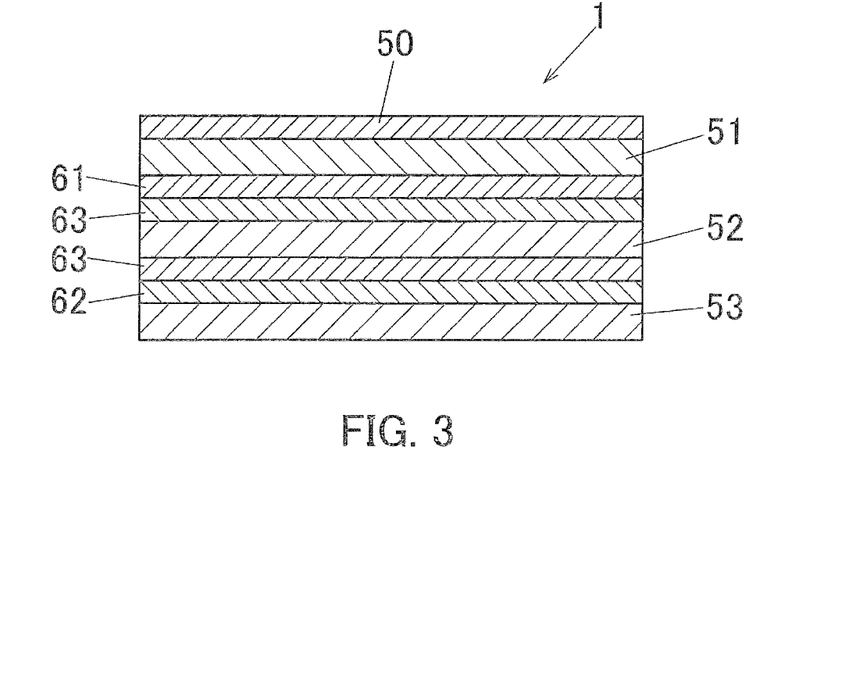
FIG. 3 is a schematic cross-sectional view schematically showing the power storage device packaging material according to one embodiment.

FIG. 3 is a schematic cross-sectional view schematically showing the basic configuration of the outer packaging laminate material constituting the packaging material 1 in this embodiment. As shown in FIG. 3, the packaging material (laminate material) 1 used in this embodiment is provided with a substrate layer (heat-resistant resin layer) 51, a metal foil layer (barrier layer) 52, and a sealant layer (heat-fusible resin layer) 53. The metal foil layer (barrier layer) 52 is bonded to one surface (inner surface) of the substrate layer 51 via a first adhesive layer 61 as an outer adhesive layer. The sealant layer (heat-fusible resin layer) 53 is bonded to one surface (inner surface) of the metal foil layer 52 via a second adhesive layer 62. Note that a chemical conversion coating film 63 is formed on both surfaces of the metal foil layer 52, and a matte coat layer 50 is laminated on the outer surface of the substrate layer 51.

In this embodiment, the substrate layer 51 is formed of, for example, a polyamide film, a polyester film, or a stretched film thereof. Among them, in terms of moldability and strength, it is preferable to use a biaxially stretched polyamide film, a biaxially stretched polybutylene terephthalate (PBT) film, a biaxially stretched polyethylene terephthalate (PET) film, or a biaxially stretched polyethylene naphthalate (PEN) film.

Examples of the polyamide film include a 6 nylon film, a 6,6 nylon film, and an MXD nylon film.

The substrate layer 51 may be formed of a single-layer structure or a multi-layer structure. In the case of forming a multi-layer structure, the multi-layer structure composed of a PET film/a polyamide film can be exemplified.

On the lower surface of the stretched film used as the substrate layer 51, that is, on the bonding surface with the first adhesive layer 61, it is desirable to subject the surface to a highly adhesion (surface) treatment to impart wettability for the purpose of improving the adhesive strength with the adhesive layer 61.

Various proposals have been made for the highly adhesion (surface) treatment, and the following treatments can be exemplified.

At least one surface of the stretched film as the substrate layer 51 is oxidized by a corona treatment, a plasma treatment, a flame plasma treatment, electron beam irradiation, UV irradiation, or the like, to improve the wettability.

Further, there is also a method of imparting the wettability by forming a highly adhesion (surface) treatment agent layer mentioned below. For example, the easy adhesion treatment agent layer can be formed by applying a water-based emulsion (aqueous emulsion) of one or a plurality of types of resins selected from the group consisting of an epoxy resin, a urethane resin, an acrylic ester resin, a methacrylic ester resin, and a polyethyleneimine resin, on a surface of a stretched film for a substrate layer, and drying it. The application quantity (formation amount) is preferably about 0.01 g/m² to about 0.5 g/m² in a solid component.

The coating method is not specifically limited but can be exemplified by a spray coating method, a gravure roll coating method, a reverse roll coating method, and a lip coating method.

The substrate layer 51 of a power storage device packaging material is desired to have higher moldability and puncture resistance in order to increase the capacity and improve the safety of the power storage device (battery). According to the research by the present inventors, it has been found that it is more suitable to use a polyamide film than a polyester film to improve the latter performance (the puncture resistance). It is more preferable to use a polyamide film satisfying the following physical properties (1) to (5). With this, good moldability and puncture resistance can be obtained.

(1) In the substrate layer 51, both the hot water shrinkage in the machine direction (MD) and the hot water shrinkage in the transverse direction (TD) should be adjusted to 2.0% to 5.0%. It is preferable to adjust both the hot water shrinkages to 2.5% to 4.5%.

Figure 4:
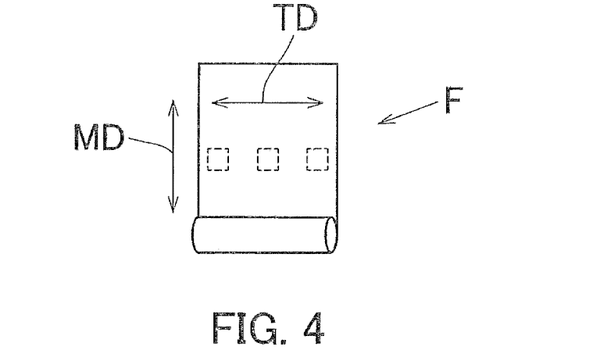
FIG. 4 is a schematic diagram for explaining a machine direction (MD) and a transverse direction (TD) in a resin film.

As shown in FIG. 4, the term "MD" refers to the machine direction (resin flow direction) of a resin film F, and the term "TD" refers to a transverse direction perpendicular to the machine direction (MD). Further, the hot water shrinkage denotes a dimensional change rate of a film (measurement target) in a shrinkage direction (stretching direction) before and after immersion of the film in hot water at 100° C. for 5 minutes.

For example, when the dimension in the shrinkage direction (MD or TD) before the hot water immersion is "X," and the dimension in the shrinkage direction (MD or TD) after the hot water immersion is "Y," the hot water shrinkage (%) in the shrinkage direction (MD or TD) is determined by a relational expression of $\{(X-Y)/X\} \times 100$. Note that in the present invention, it is preferable to adopt an average value (average hot water shrinkage) of the hot water shrinkage as the "hot water shrinkage" indicating a characteristic value of a polyamide film.

In the present invention, the average hot water shrinkage denotes an average value of hot water shrinkages at three points, i.e., two points of both end portions and the hot water shrinkage and one point of the central portion, with respect to one direction of the sheet (film) to be measured. However, in the present invention, depending on the size of the power storage device main body 10, as the "hot water shrinkage" indicating the characteristic value of the polyamide film, it is also possible to adopt a hot water shrinkage (a hot water absorption rate at a reference position) measured at a certain position, which is not an average value.

(2) The difference between the hot water shrinkage of the substrate layer 51 in the machine direction (MD) and the hot water shrinkage of the substrate layer 51 in the transverse direction (TD) should be adjusted to 1.5% or less. Preferably, it is adjusted to 1.2% or less. Specifically, when the average hot water shrinkage in the machine direction (MD) is "MDz" and the hot water shrinkage in the transverse direction (TD) is "TDz," a relational expression of $|MDz-TDz| \leq 1.5\%$ should be established. Preferably, it is adjusted to $|MDz-TDz| \leq 1.2\%$.

(3) Both the elastic modulus of the substrate layer 51 in the machine direction (MD) and the elastic modulus of the substrate layer 51 in the transverse direction (TD) should be adjusted to 1.5 GPa to 3 GPa. Preferably, both of them are adjusted to 2.0 GPa to 2.5 GPa.

(4) At least one of the breaking strength of the substrate layer 51 in the machine direction (MD) and the breaking strength of the substrate layer 51 in the transverse direction (TD) is preferably adjusted to 320 MPa or more, more preferably 400 MPa or less.

(5) The number average molecular weight of the polyamide film constituting the substrate layer 51 is preferably adjusted to 15,000 to 30,000, more preferably 20,000 to 25,000.

Here, in this embodiment, since the hot water shrinkage in the machined direction (MD) and the hot water shrinkage in the transverse direction (TD) are 2.0% or more, appropriate flexibility can be provided, and good moldability can be secured as the substrate layer 51. Further, since the hot water shrinkage is 5.0% or less, as the substrate layer 51, excessive flexibility can be avoided, which makes it possible to maintain desired strength.

Furthermore, in this embodiment, since the difference between the hot water shrinkage in the machine direction (MD) and the hot water shrinkage in the transverse direction (TD) are adjusted to fall within the above-described specified range, it is possible to efficiently disperse the force from the external pressure, which makes it possible to assuredly maintain the desired strength as the substrate layer 51.

Further, since the elastic modulus of the substrate layer 51 in the machine direction (MD) and the elastic modulus of the substrate layer 51 in the transverse direction (TD) are adjusted to fall within the above-described specified ranges, it is possible to more assuredly maintain moderate flexibility and strength as the substrate layer 51.

Further, in a case where the breaking strength of the substrate layer 51 in the machine direction (MD) and the breaking strength of the substrate layer 51 in the transverse direction (TD) are adjusted to fall within the above-described specified range, the desired strength can be more assuredly obtained as the substrate layer 51.

By adopting a polyamide film having the above-described properties for the substrate layer 51 as described above, it is possible to obtain a packaging material 1 having good moldability and excellent puncture resistance.

When the number average molecular weight of the nylon as the substrate layer 51 is 15,000 or more, the substrate layer 51 becomes less likely to crack. When the number average molecular weight of the nylon is 30,000 or less, the flexibility of the substrate layer 51 can be maintained, which less likely causes cracks.

Further, in this embodiment, the relative viscosity of the polyamide film as the substrate layer 51 is preferably adjusted to 2.9 to 3.1. In other words, in a case where the relative viscosity is adjusted to fall within the above-specified range, the strength and flexibility can be more effectively imparted to the substrate layer 51. Thus, it is possible to assuredly obtain the packaging material 1 excellent in moldability and high in puncture resistance.

In this embodiment, the puncture strength of the packaging material 1 is preferably within the range of 22 N to 30 N, more preferably 24 N to 30 N, and even more preferably 26 N to 30 N.

Further, in this embodiment, the thickness of the polyamide film as the substrate layer 51 is preferably adjusted to 9 μm to 50 μm, more preferably to 12 μm to 30 μm.

Here, the distribution of the hot water shrinkage in the polyamide film of this embodiment will be described. In a square polyamide film, when the hot water shrinkages at three points, i.e., two points of both sides in the machine direction (MD) and one points on the center line, are three fixed-point hot water shrinkages of MD and the hot water shrinkages at three points, i.e., two points of both sides in the transverse direction (TD) and one points on the center line, are three fixed-point hot water shrinkages of TD, it is preferable to use a film in which the difference between the maximum fixed-point hot water shrinkage and the minimum fixed-point hot water shrinkage among fixed-point hot water shrinkages at a total of six points, i.e., three points in the machine direction (MD) and three points in the transverse direction (TD), is adjusted to 2.5 or less.

Note that the average value of the fixed-point hot water shrinkages at three points in the machine direction (MD) corresponds to the average hot water shrinkage in the machine direction (MD), and the average value of the hot water shrinkages at the three points in the transverse direction (TD) corresponds to the average hot water shrinkage in the transverse direction (TD).

Here, the three regions indicated by the broken lines in FIG. 4 are all square regions of the same size in the polyamide film (substrate layer 51). In a case where these square regions satisfy the distribution condition of the above-described hot water shrinkage, the deviation of flexibility is suppressed over the entire region of the substrate layer 51. Therefore, even if external stress is applied, the stress is dispersed to the entire substrate layer 51, resulting in hard-to-break. Thus, strength can be assuredly improved.

In this embodiment, the substrate layer 51 is formed of a polyamide film, but another layer may be laminated on the substrate layer 51 as described above.

In the substrate layer 51, a resin having a melting point higher by 10° C. or more, preferably 20° C. or more, than that of all resins constituting the sealant layer 53 is preferably employed. That is, in a case where this configuration is adopted, it is possible to avoid adverse effects of heat on the substrate layer 51 when thermally fusing the sealant layers 53.

In this embodiment, the first adhesive layer (colored adhesive layer) 61 is a layer for bonding the metal foil layer 52 and the substrate layer 51 and imparting a color (including an achromatic color) to the outer surface of the packaging material 1. The first adhesive layer (colored adhesive layer) 61 is made of colored adhesive compositions including a color pigment and a particular adhesive (adhesive component).

As the color pigment, an azo-based pigment, a phthalocyanine-based pigment, a condensed polycyclic pigment, an inorganic-based pigment, or the like can be suitably used. Further, as the black pigment, carbon black can be recommended.

As the color pigment, a color pigment having an average particle diameter of 0.1 μm to 5 μm is preferably used. A particularly preferable average particle diameter thereof is 0.5 μm to 2.5 μm.

When dispersing the color pigments, it is preferable to use a pigment dispersing machine. A pigment dispersant, such as, e.g., a surfactant, can be used when performing the pigment dispersion.

The adhesive components of the first adhesive layer 61 are configured by an adhesive including a two-part curing type polyester urethane resin composed of a polyester resin as a main agent and a polyfunctional isocyanate compound as a curing agent. In the present invention, by defining the molecular weight of a polyester resin which is a main agent of the above-described two-part curing type polyester urethane resin and the type of the polyfunctional isocyanate compound which is a curing agent, adhesive strength and moldability can be improved to suppress the delamination when deep forming is performed at the time of molding the packaging material 1.

The above-described polyester resin as a main agent is a copolymer composed of dicarboxylic acid and dialcohol as raw materials, and the preferred materials and compositions are as follows.

It is preferable to use both aliphatic dicarboxylic acid and aromatic dicarboxylic acid as the above-described dicarboxylic acid. Further, the oddness and evenness of the number of methylene in the methylene chain of the aliphatic dicarboxylic acid is a factor that affects the crystallinity of the resin, and dicarboxylic acid having an even number of methylene produces a resin having high crystallinity. Therefore, it is preferable to use aliphatic dicarboxylic acid having an even number of methylene. As the aliphatic dicarboxylic acid having an even number of methylene number, succinic acid (methylene number is 2), adipic acid (methylene number is 4), suberic acid (methylene number is 6), and sebacic acid (methylene number is 8) can be exemplified As the aromatic dicarboxylic acid, isophthalic acid, terephthalic acid, naphthalene dicarboxylic acid, and phthalic anhydride can be exemplified.

Further, by setting the content rate of aromatic dicarboxylic acid to the total content of the aliphatic dicarboxylic acid and the aromatic dicarboxylic acid to fall within the range of 40 mole % to 80 mole %, in other words, by limiting the content rate of aliphatic dicarboxylic acid in the range of 20 mole % to 60 mole %, it is possible to generate a resin having high adhesive strength and good moldability which can be formed into a molded case having a high side wall, which makes it possible to provide an exterior material (packaging material) 1 capable of suppressing the delamination between the metal foil layer 52 and the substrate layer 51.

Here, when the content rate of aromatic dicarboxylic acid is less than 40 mole %, the film physical properties deteriorate and cohesive fracture is likely to occur, which may cause delamination.

On the other hand, when the content rate of aromatic dicarboxylic acid exceeds 80 mole %, the resin becomes hard, and the adhesive performance tends to deteriorate. The content rate of the aromatic dicarboxylic acid is particularly preferably 50 mole % to 70 mole %.

Examples of dialcohol in the polyester resin as a main agent of the adhesive component include ethylene glycol, propylene glycol, 1,3 butanediol, 1,4-butanediol, diethylene glycol, dipropylene glycol, neopentyl glycol, 1,5-pentanediol, 1,6-hexanediol, octanediol, 1,4-cyclohexanediol, and 2-butyl-2-ethyl-1,3-propanediol.

In the molecular weight of the polyester resin, it is preferable that the number average molecular weight (Mn) be set in a range from 8,000 to 25,000, the weight average molecular weight (Mw) be set in a range from 15,000 to 50,000, and the ratio (Mw/Mn) thereof be set to 1.3 to 2.5. When the number average molecular weight (Mn) is 8,000 or more, and the weight average molecular weight (Mw) is 15,000 or more, suitable coating film strength and heat resistance can be obtained. When the number average molecular weight (Mn) is 25,000 or less, and the weight average molecular weight (Mw) is 50,000 or less, appropriate coating film elongation can be obtained without becoming too hard.

Further, when the ratio (Mw/Mn) is 1.3 to 2.5, adequate molecular weight distribution can be obtained, and thus, it is possible to maintain a balance between adhesive coating suitability (wide distribution) and performance (narrow distribution).

In the above-described polyester resin, the particularly preferred number average molecular weight (Mn) is 10,000 to 23,000, the particularly preferred weight average molecular weight (Mw) is 20,000 to 40,000, and the particularly preferred ratio thereof (Mw/Mn) is 1.5 to 2.3.

Further, the molecular weight of the above-described polyester resin can be adjusted by changing the chain with isocyanate that is polyfunctional. That is, when the polyester component in a main agent is linked by NCO, a polymer having a hydroxyl group at the end is provided, and the molecular weight of the polyester resin can be adjusted by adjusting the equivalent ratio between the isocyanate group and the hydroxyl group of the polyester. In the present invention, it is preferable to use a polyester resin connected such that the equivalent ratio (OH/NCO) is in the range of 1.01 to 10. Further, as other methods for adjusting the molecular weight, changing the reaction conditions (adjusting the mixing molar ratio of the dicarboxylic acid and the dialcohol) of the polycondensation reaction of the dicarboxylic acid and the dialcohol can be exemplified.

Further, in this embodiment, an epoxy-based resin or an acryl-based resin may be added as an additive to the main agent in the adhesive components.

As the polyfunctional isocyanate compound which is the curing agent of the adhesive components, various isocyanate compounds of aromatic, aliphatic, or alicyclic systems can be used. Specifically, a multifunctional isocyanate modified product composed of one or two or more types of diisocyanates, such as, e.g., aliphatic isocyanate of hexamethylene diisocyanate (HDI), isophorone diisocyanate (IPDI), aromatic isocyanate of tolylene diisocyanate (TDI), and diphenylmethane diisocyanate (MDI), can be exemplified.

Examples of modifying means include an adduct with a polyfunctional active hydrogen compound, such as, e.g., water, glycerol, and trimethylolpropane, and a polyfunctional isocyanate modified product obtained by a polymerization reaction, such as, e.g., isocyanuration, carbodiimidization, and polymerization. One or a mixture of two or more of these may be used. However, in order to increase the adhesive strength after curing to obtain a peel-preventing effect of the substrate layer 51, it is preferable to contain an aromatic isocyanate compound in the amount of 50 mole % or more. The more preferable amount of the aromatic isocyanate compound is 70 mole % or more.

In the two-part curing type polyester urethane resin of the adhesive components, the main agent and the curing agent are preferably blended at a ratio of 2 moles to 25 moles of the isocyanate functional group (—NCO) to 1 mole of the polyol hydroxyl group (—OH).

When the molar ratio (—NCO)/(—OH) becomes less than 2, which is low in the isocyanate functional group (—NCO), adequate coating film strength and heat resistance may not be obtained due to the insufficient curing reaction. On the other hand, when the (—NCO)/(—OH) exceeds 25, and the isocyanate functional group (—NCO) increases, the reaction with the functional group other than the polyol may excessively proceed, and the coating film may become too hard, which may result in inadequate elongation. The particularly preferred molar ratio (—NCO)/(—OH) of the polyol hydroxyl group and the isocyanate functional group is 5 to 20.

In the two-part curing type polyester urethane resin, it is preferable that the cured film after reaction have the following physical properties.

In the cured film, it is preferable that the Young's modulus by a tensile test (JIS K7162) be 70 MPa to 400 MPa to ensure good moldability of the sealing packaging material and bonding strength between layers. The particularly preferred Young's modulus is 100 MPa to 300 MPa.

Further, it is preferable that the breaking strength be 20 MPa to 70 MPa, and the breaking elongation be between 50% and 400%. The particularly preferred breaking strength is 30 MPa to 50 MPa, and the particularly preferred breaking elongation is 100% to 300%.

Figure 5:
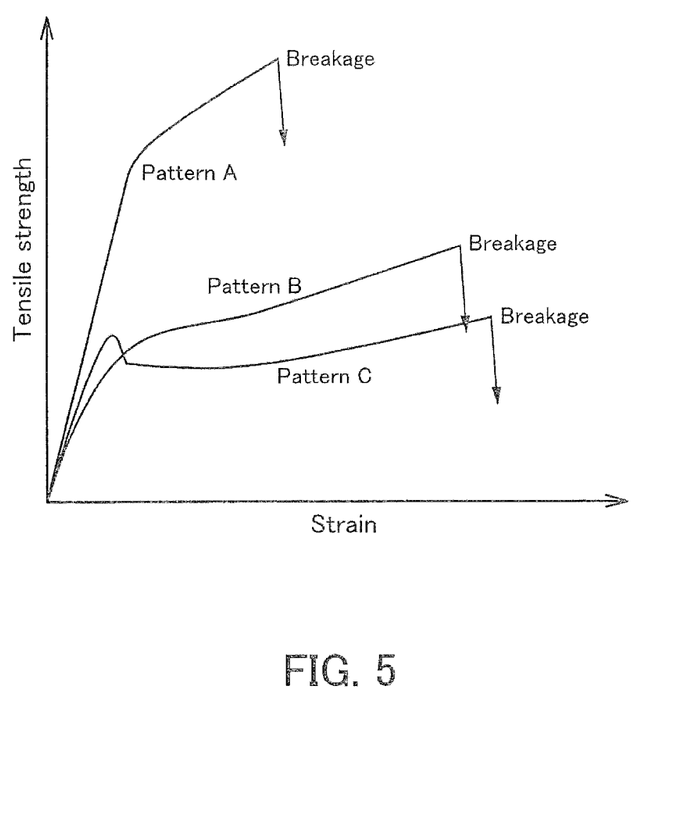
FIG. 5 is an S-S curve diagram of a cured film of a two-part curing type polyester urethane resin adhesive.

Furthermore, it is preferable that the tensile stress-strain curve (S-S curve) do not exhibit a decrease in strength before breakage. FIG. 5 shows three patterns of S-S curves. The pattern A is small in the strain amount with respect to the tensile stress, and the pattern B is large in the strain amount with respect to the tensile stress. But, in both the pattern A and the pattern B, the strain amount increases as the tensile stress increases, and therefore, no decrease in strength before breakage is observed. On the other hand, in the pattern C, the tensile stress decreases in the process of increasing the strain amount, which shows a decrease in strength prior to the breakage. In the present invention, it is preferable that the cured film of the two-part curing type adhesive agent do not decrease in strength in the S-S curve. More preferably, the S-S curve have no bending point at which the strength rapidly changes.

The two-part curing type polyester urethane resin containing an adhesive is prepared as a low-viscosity fluid by polycondensing dicarboxylic acid and dialcohol which are raw materials of a polyester resin, if necessary, further chain-extending with polyfunctional isocyanate, mixing various additives, such as, e.g., a solvent, a urethanization reaction catalyst, a coupling agent or an epoxy resin for improving adhesion, a defoaming agent, a leveling agent, an ultraviolet absorber, and an antioxidant, to obtain a fluid polyester resin solution, and blending a polyfunctional isocyanate compound which is a curing agent or further blending a solvent thereto.

The preferable conditions (1) and (2) of the components in the above-described colored adhesive composition constituting the first adhesive layer 61 are as follows. Note that the content rate described below denotes a ratio of a solid component that does not contain a solvent.

(1) The application quantity (abundance) of the colored adhesive composition as the first adhesive layer 61 is 5 g/m$^2$ to 10 g/m$^2$.

(2) The first adhesive layer 61 contains a color pigment of 0.25 g/m$^2$ to 0.49 g/m$^2$.

Based on the above-described conditions (1) and (2), the content rate of the color pigment contained in the first adhesive layer 61 is preferably 2 mass % or more and less than 5 mass %.

When the content rate of the color pigment is 5 mass % or more, the improvement of visual effect cannot be expected, and rather, peeling in a hot water submersion test may easily occur. When the content rate of the color pigment is less than 2 mass %, the screening effect becomes poor, and the visual effect becomes inadequate, which may cause a visual problem.

Therefore, the range of the content rate of the color pigment contained in the first adhesive layer according to the present application is 2 mass % or more and less than 5 mass %. The more preferable content rate of the color pigment is 2.5 mass % or more and 4.5 mass % or less.

When the content of the color pigment is less than 0.25 g/m$^2$, the screening effect and the visual effect are insufficient, which may be problematic in terms of design, and is not preferable. Further, when the content of the color pigment exceeds 0.49 g/m$^2$, there is almost no improvement in visual effect, and rather, peeling in a hot water submersion test, which will be described later, may easily occur. Therefore, the valid content range of the color pigment contained in the first adhesive layer 61 of the present application is a range of 0.25 g/m$^2$ to 0.49 g/m$^2$. The more preferable content of the color pigment is within the range of 0.25 g/m$^2$ to 0.45 g/m$^2$.

The content rate (density) range of the color pigment is an essential condition in a case where a 45° C. hot water submersion test is performed as the most severe environmental test after molding a battery packaging material. When the content of the color pigment exceeds 0.49 g/m$^2$, the first adhesive layer 61 becomes hard and brittle, and the adhesive strength to the metal foil layer 52 decreases, causing the delamination of the substrate layer (heat-resistant resin layer) 51 during a hot water submersion test.

Further, in a typical environmental test (high-temperature high-humidity storage test of 70° C.×90% RH) after molding a battery packaging material, when the content of the color pigment is 0.49 g/m$^2$ or less, the substrate layer (heat-resistant resin layer) 51 is not peeled off during the storage test and can be used.

When the content of the color pigment exceeds 0.49 g/m$^2$, the possibility of peeling of the substrate layer 51 during a high-temperature and high-humidity storage test increases, which is not preferable.

When the application quantity of the first adhesive layer (colored adhesive composition) 61 is less than 5 g/m$^2$, the content of the color pigment is small, and therefore, the effectiveness of concealing the metal foil layer 52 is reduced as described above, and metallic luster is visually recognized, which may impair the profound feeling.

Further, when the application quantity of the first adhesive layer 61 exceeds 10 g/m$^2$, the moldability significantly deteriorates, leading to an increase in cost. The preferred application quantity of the colored adhesive composition is 6 g/m$^2$ to 10 g/m$^2$.

The colored adhesive composition is prepared by blending a color pigment and the adhesive which is the two-part curing type polyester urethane resin prepared by the above-described method (containing a solvent and various additives) at a predetermined ratio.

Further, the method of bonding the metal foil layer 52 and the substrate layer 51 is not limited, but a method called "dry lamination" can be recommended. Specifically, the above-described colored adhesive composition is applied to the upper surface (outer surface) of the metal foil layer 52, or the lower surface (inner surface) of the substrate layer 51, or both of these surfaces, and the solvent is caused to be evaporated to form a dry film. Thereafter, the metal foil layer 52 and the substrate layer 51 are bonded to each other. Thereafter, the two-part curing type polyester urethane resin is further cured according to the curing conditions thereof. With this, the metal foil layer 52 and the substrate layer 51 are bonded to each other via the first adhesive layer 61. Note that the coating method of the colored adhesive composition can be exemplified by a gravure coating method, a reverse roll coating method, a lip roll coating method, and the like.

In this embodiment, the metal foil layer 52 provides a gas barrier property for preventing the invasion of oxygen and moisture.

Examples of the metal foil layer 52 include an aluminum foil, a copper foil, and a stainless-steel foil. Among them, an aluminum foil can be suitably used. In particular, in the case of using an Al—Fe-based alloy foil containing Fe of 0.7 mass % to 1.7 mass %, excellent strength and ductility can be obtained, resulting in good moldability.

The thickness of the metal foil layer 52 is preferably set to 20 μm to 100 μm, more preferably 25 μm to 60 μm. That is, when the thickness is 20 μm or more, it is possible to prevent pinholes from being generated at the time of rolling when producing the metal foil. When the thickness is 100 μm or less, it is possible to reduce the stresses during stretch forming or drawing, thereby improving moldability.

In the exterior material (packaging material) of the present invention, by forming a chemical conversion coating film 63 having a higher corrosion resistance on the surface of the metal foil layer 52, the corrosion resistance in the metal foil layer 52 can be improved.

Examples of the chemical conversion treatment include a chromate treatment and a non-chromium chemical conversion treatment using a zirconium compound.

For example, in the case of a chromate treatment, an aqueous solution of any one of the following mixtures 1) to 3) is applied to the surface of a metal foil layer subjected to a degreasing treatment, and then drying is performed.

1) a mixture of phosphoric acid, chromic acid, and at least one of metal salt of fluoride and non-metal salt of fluoride
2) a mixture of phosphoric acid, any one of an acryl-based resin, a chitosan derivative resin, and a phenol-based resin, and at least one of chromic acid and chromium (III) salt
3) a mixture of phosphoric acid, any one of an acryl-based resin, a chitosan derivative resin, and a phenol-based resin, at least one of chromic acid and chromium (III) salt, and at least one of metal salt of fluoride and non-metal salt of fluoride The chromium adhesion amount of the chemical conversion coating film 63 is preferably set to 0.1 mg/m$^2$ to 50 mg/m$^2$, more preferably 2 mg/m$^2$ to 20 mg/m$^2$.

Note that the chemical conversion coating film 63 may be provided to either one of the surfaces of the metal foil layer 52.

The sealant layer (heat-fusible resin layer, thermoplastic resin layer) 53 provides excellent chemical resistance against a strong corrosiveness electrolyte used in a lithium-ion secondary battery or the like, and also provides a heat sealing property to the packaging material 1.

The sealant layer 53 is preferably a heat-fusible resin non-stretched film layer. The heat-fusible resin non-stretched film is preferably formed of a non-stretched film made of at least one type of a heat-fusible resin selected from the group consisting of polyethylene, polypropylene, an olefin-based copolymer, and an acid-modified above product and ionomers thereof, from the view point of chemical resistance and heat-sealing properties.

The thickness of the sealant layer 53 is preferably set to 20 μm to 80 μm, more preferably 25 μm to 50 μm. That is, when the thickness to set to 20 μm or more, the generation of pinholes can be sufficiently prevented, and when the thickness is set to 80 μm or less, the amount of the resin used can be reduced, resulting in a cost reduction.

Note that the sealant layer 53 may be a single layer or multiple layers. In the case of multiple layers, a three-layer film in which a random polypropylene film is laminated on both surfaces of a block polypropylene film can be exemplified.

Examples of the second adhesive layer (non-colored adhesive layer) 62 include an adhesive layer made of a polyurethane-based adhesive, an acryl-based adhesive, an epoxy-based adhesive, a polyolefin-based adhesive, an elastomer-based adhesive, a fluorine-based adhesive, an acid-modified polypropylene adhesive, and the like.

Among them, acrylic-based adhesive and polyolefin-based adhesive are preferably used. In this case, the electrolyte resistance and the water vapor barrier property of the packaging material 1 can be improved.

The method of bonding the metal foil layer 52 and the sealant layer 53 is not limited, but as in the method of bonding the metal foil layer 52 and the substrate layer 51, a dry lamination method in which an adhesive constituting the second adhesive layer 62 is applied and dried and then bonding is performed can be exemplified.

The matte coat layer 50 is a layer laminated on the outer surface of the substrate layer 51 to improve moldability by imparting good slipperiness to the surface of the packaging material 1.

The matte coat layer 50 contains a binder resin and fine solid particles (wax, resin beads, and fine inorganic particles). The wax has an average particle diameter of 5 µm to 20 µm, the resin beads have an average particle diameter of 1 µm to 10 µm, the fine inorganic particles have an average particle diameter of 1 µm to 10 µm, each fine solid particle is contained in the amount of 1 mass % to 20 mass %, and the total content of the fine solid particles, such as, e.g., wax, resin beads, and fine inorganic particles, contained in the matte coat layer 50 is preferably 30 mass % or more and 50 mass % or less.

The binder resin is preferably a resin composed of a main agent polyol and a curing agent polyfunctional isocyanate, and is exemplified by at least one selected from the group consisting of an acrylic polyol resin, a urethane polyol resin, a polyolefin polyol resin, a polyester polyol resin, a phenoxy-based resin, a copolymer of tetrafluoroolefin and carboxylic acid vinylester, and a copolymer of tetrafluoroolefin and alkyl vinyl ether.

As the binder resin, a fluorine-based resin based on tetrafluoroethylene is preferably used, from the viewpoint of excellent heat resistance and chemical resistance.

Examples of the wax include at least one selected from polyethylene wax, polypropylene wax, and polytetrafluoroethylene wax.

As the wax, a wax having an average particle diameter of 5 µm to 20 µm is preferably used, and a wax having an average particle diameter of 6 µm to 18 µm is more preferably used. The content rate of the wax is preferably set to 1 mass % and 10 mass %, more preferably 2 mass % and 8 mass %.

Examples of the resin beads include at least one selected from acrylic resin beads, urethane resin beads, polyethylene resin beads, polystyrene resin beads, silicone resin beads, and fluoropolymer beads. As the resin beads, those having an average particle diameter of 1 µm to 10 µm is preferably used. More preferably, those having an average particle diameter of 2 µm to 8 µm is used. Further, the content rate of the resin beads is preferably set to 1 mass % to 20 mass %, more preferably 3 mass % to 17 mass %.

Examples of the fine inorganic particles include at least one selected from silica, alumina, kaoline, calcium oxide, calcium carbonate, calcium sulfate, barium sulfate, and calcium silicate. As the fine inorganic particles, it is preferable to use fine inorganic particles having an average particle diameter of 1 µm to 10 µm, more preferably 1 µm to 5 pm.

Further, the content rate of the fine inorganic particles is preferably set to 20 mass % to 40 mass %, more preferably to 25 mass % to 35 mass %.

The matte coat layer 50 is formed by applying the matte coat compositions containing fine solid particles and a heat-resistant resin to the surface of the substrate layer 51 and curing them.

In the matte coat layer 50, the thickness is preferably set to 0.5 µm to 5 µm, more preferably 1 µm to 3 µm. When the matte coat layer 50 is too thin, slipperiness improvement is less effective, and when it is too thick, the cost increases. Thus, both of which are not preferable.

The timing of the step of forming the matte coat layer 50 is not limited, but the step is preferably performed following the step of bonding the substrate layer 51 to the metal foil layer 52 via the first adhesive layer 61. Note that the matte coat layer 50 may be formed by bonding a non-stretched polypropylene (CPP) film to the substrate layer 51.

In the above-described embodiment, the case in which the sealing packaging material of the present invention is used as an exterior material for a power storage device, such as, e.g., a battery, has been described as an example. However, the present invention is not limited thereto. The packaging material of the present invention can also be used as a packaging material for sealing and encapsulating contents, such as, e.g., foods and pharmaceuticals.

Further, in the above-described embodiment, the case in which the sheet-like exterior material (packaging material) 1 is used as the cover member 3 has been described, but the present invention is not limited thereto. In the present invention, the cover member 3 may be subjected to molding processing. For example, the cover member may be configured by a molded article having a hat-shaped cross-section in which the central portion is formed to be recessed (formed to bulge) upward, and the outer peripheral edge portion of the hat-shaped cover member may be integrally joined to the tray member described above so as to cover the tray member from above.

Further, in the present invention, a casing may be formed by stacking two unmolded sheets-like exterior materials (packaging materials) 1 so as to sandwich a power storage device main body therebetween, and heat-sealing the outer peripheral edge portions thereof.

Further, in the above-described embodiment, the case in which the casing is formed using two exterior materials (packaging laminate materials), but the present invention is not limited thereto. In the present invention, the number of packaging materials forming the casing is not limited and may be one or three or more.

Needless to say, in the packaging material of the present invention, it is not always necessary to provide the matte coat layer 50, the chemical conversion coating film layers 63, and the like which are preferably required. Examples Next, Examples including the gist of the present invention and Comparative Examples for deriving the effects will be described. Needless to say, the present invention is not limited to the following examples.

In the following Example 1 to 8 and Comparative Examples 1 to 9, laminated exterior materials (packaging materials) having the lamination structure shown in FIG. 3 were prepared. As shown in Tables 1A and 1B, in Examples and Comparative Examples, the configurations of the polyamide film as a substrate layer and the first adhesive layer (coloring adhesive layer) differ, and the remaining configurations are the same.

TABLE 1A

| | Substrate layer (polyamide film) | | | | | | | |
|---|---|---|---|---|---|---|---|---|
| | Thickness | Hot water shrinkage (%) | | | Elastic modulus (GPa) | | Breakage strength (MPa) | | Number average molecular |
| | (μm) | TD | MD | TD – MD | TD | MD | TD | MD | weight |
| Ex. 1 | 25 | 2.7 | 2.0 | 0.7 | 1.7 | 2.7 | 361 | 280 | 25,000 |
| Ex. 2 | 20 | 4.3 | 3.4 | 0.9 | 2.3 | 2.5 | 345 | 282 | 30,000 |
| Ex. 3 | 20 | 3.7 | 3.0 | 0.7 | 1.9 | 2.5 | 372 | 305 | 23,000 |
| Ex. 4 | 20 | 4.2 | 3.8 | 0.4 | 2.0 | 2.7 | 333 | 297 | 16,000 |
| Ex. 5 | 15 | 3.5 | 2.5 | 1.0 | 2.1 | 2.3 | 380 | 329 | 21,000 |
| Ex. 6 | 15 | 4.6 | 3.4 | 1.2 | 2.0 | 2.2 | 329 | 315 | 20,000 |
| Ex. 7 | 15 | 3.2 | 2.6 | 0.6 | 1.9 | 2.2 | 372 | 313 | 22,000 |
| Ex. 8 | 15 | 4.6 | 3.4 | 1.2 | 2.0 | 2.2 | 329 | 315 | 20,000 |
| Comp. Ex. 1 | 15 | 4.6 | 2.6 | 2.0 | 1.9 | 2.2 | 323 | 296 | 21,000 |
| Comp. Ex. 2 | 15 | 3.8 | 2.1 | 1.7 | 1.5 | 2.0 | 303 | 281 | 18,000 |
| Comp. Ex. 3 | 15 | 4.6 | 2.6 | 2.0 | 1.9 | 2.2 | 323 | 296 | 21,000 |
| Comp. Ex. 4 | 15 | 4.6 | 2.6 | 2.0 | 1.9 | 2.2 | 323 | 296 | 21,000 |
| Comp. Ex. 5 | 15 | 4.6 | 2.6 | 2.0 | 1.9 | 2.2 | 323 | 296 | 21,000 |
| Comp. Ex. 6 | 15 | 3.3 | 1.7 | 1.6 | 1.8 | 2.1 | 350 | 300 | 22,000 |
| Comp. Ex. 7 | 15 | 3.5 | 2.8 | 0.7 | 1.1 | 1.8 | 320 | 273 | 23,000 |
| Comp. Ex. 8 | 15 | 4.7 | 3.2 | 1.5 | 2.7 | 3.2 | 395 | 325 | 35,000 |
| Comp. Ex. 9 | 15 | 3.2 | 2.9 | 0.3 | 1.9 | 2.4 | 301 | 296 | 11,000 |

TABLE 1B

| | First adhesive layer (colored adhesive layer) | | | | | |
|---|---|---|---|---|---|---|
| | Pigment concentration (mass %) | Application amount (g/m²) | Pigment application amount (g/m²) | Number average molecular weight Mn | Weight average molecular weight Mw | Mw/Mn |
| Ex. 1 | 3.9 | 6.8 | 0.27 | 12,000 | 20,500 | 1.7 |
| Ex. 2 | 4.8 | 7.5 | 0.36 | 22,000 | 36,000 | 1.6 |
| Ex. 3 | 2.8 | 9.5 | 0.27 | 12,000 | 20,500 | 1.7 |
| Ex. 4 | 4.3 | 6.0 | 0.26 | 12,000 | 20,500 | 1.7 |
| Ex. 5 | 4.5 | 5.5 | 0.25 | 10,000 | 20,000 | 2.0 |
| Ex. 6 | 4.9 | 8.5 | 0.42 | 24,000 | 35,000 | 1.5 |
| Ex. 7 | 3.5 | 8.0 | 0.28 | 12,000 | 20,500 | 1.7 |
| Ex. 8 | 3.0 | 9.0 | 0.27 | 12,000 | 20,500 | 1.7 |
| Comp. Ex. 1 | 1.7 | 13.0 | 0.22 | 12,000 | 20,500 | 1.7 |
| Comp. Ex. 2 | 1.5 | 9.0 | 0.14 | 12,000 | 20,500 | 1.7 |
| Comp. Ex. 3 | 6.0 | 7.7 | 0.46 | 12,000 | 20,500 | 1.7 |
| Comp. Ex. 4 | 9.0 | 5.8 | 0.52 | 12,000 | 20,500 | 1.7 |
| Comp. Ex. 5 | 15.0 | 6.0 | 0.90 | 12,000 | 20,500 | 1.7 |
| Comp. Ex. 6 | 4.5 | 5.5 | 0.25 | 10,000 | 20,000 | 2.0 |
| Comp. Ex. 7 | 4.5 | 5.5 | 0.25 | 10,000 | 20,000 | 2.0 |
| Comp. Ex. 8 | 4.5 | 5.5 | 0.25 | 10,000 | 20,000 | 2.0 |
| Comp. Ex. 9 | 4.5 | 5.5 | 0.25 | 10,000 | 20,000 | 2.0 |

Example 1

As a metal foil layer, an aluminum foil made of aluminum (JIS H4160 A8079) having a thickness of 35 μm was prepared. Further, on both surfaces of the aluminum foil, a chemical conversion treatment solution composed of polyacrylic acid, trivalent chromic compound, water, and alcohol was applied and then dried at 150° C. to form a chemical conversion coating film. The chromium adhesion amount by this chemical conversion coating film was 10 mg/m².

As a substrate layer, a biaxially stretched nylon (ONY) film having a thickness of 25 μm was prepared. The bonding surface (lower surface) of this film to be bonded to the first adhesive layer was subjected to a corona treatment.

In the biaxially stretched nylon film as a substrate layer, the hot water shrinkage in the transverse diction (TD) was 2.7%, the hot water shrinkage in the machine direction (MD) was 2.0%, the difference (TD-MD) between the hot water shrinkage in the transverse direction (TD) and the hot water shrinkage in the machine direction (MD) was 0.7%, the elastic modulus in the transverse direction (TD) was 1.7 GPa, the elastic modulus in the machine direction (MD) was 2.7 GPa, the breaking strength in the transverse direction (TD) was 361 MPa, the breaking strength in the machine direction (MD) was 280 MPa, and the number average molecular weight (Mn) of of polyamide was 25,000.

The colored adhesive composition constituting the first adhesive layer was prepared by the following method using a two-part curing type polyester urethane resin as an adhesive component and carbon black as a color pigment.

First, a polyester resin (polyester polyol) which is a main agent of the two-part curing type polyester urethane resin was produced. The main agent (polyester polyol) was prepared by melting 30 parts by mole of neopentyl glycol, 30 parts by mole of ethylene glycol, and 40 parts by mole of 1,6-hexanediol at 80° C., and subjecting 30 parts by mole of adipic acid (methylene number is 4) which is aliphatic dicarboxylic acids and 70 parts by mole of isophthalic acid which is aromatic dicarboxylic acids to a polycondensation reaction while stirring at 210° C. for 20 hours. This polyester polyol had the number average molecular weight (Mn) of 12,000, the weight average molecular weight (Mw) of 20,500, and the ratio thereof (Mw/Mn) of 1.7. Further, 60 parts by mass of ethylacetate was added to 40 parts by mass of the polyester polyol to obtain a polyester polyol resin solution in a flow state. Further, the hydroxyl value was 2.2 mgKOH/g (solution value).

Next, a required amount of carbon black having an average particle diameter of 1.0 μm was blended into 100 parts by mass of the polyester polyol resin solution and 64.4 parts by mass of the ethyl acetate, and a carbon black pigment was dispersed using a pigment disperser to obtain a main agent containing a color pigment. Then, 7.1 parts by mass of an adduct (NCO %: 13.0%, solid content: 75%) of tolylene diisocyanate (TDI) (aromatic type), which is an aromatic isocyanate compound and trimethylolpropane was blended as a curing agent with respect to 100 parts by mass of the above-described colored pigment contained main agent. Further, 34.1 parts by mass of ethyl acetate was blended, and the mixture was sufficiently stirred to obtain a colored adhesive composition. In this colored adhesive composition, the molar ratio (—NCO)/(—OH) of the isocyanate functional group (—NCO) to the polyester polyol hydroxyl group (—OH) was 10. As shown in Table 1B, the pigment density (pigment content rate) in this colored adhesive composition was 3.9 mass %.

A cured film made of the above-described two-part curing type polyester urethane resin adhesive, i.e., a cured film having compositions obtained by excluding the color pigment from the compositions of the first adhesive layer, was prepared and evaluated for physical properties. Specifically, the two-part curing type polyester urethane resin adhesive was applied to a non-adhesive untreated PP film so as to be 50 μm in thickness after drying, the solvent was dried, then the resin adhesive was cured by aging at 60° C. until the residual isocyanate became 5% or less. The cured film was peeled off from the untreated PP film and cut into 15 mm widths to obtain test pieces.

The prepared test piece was subjected to a tensile test under the conditions of a gauge length of 50 mm and a tensile speed of 200 mm/min to measure the Young's modulus, the breaking strength, and the breaking elongation. The Young modulus was 140 MPa, the breaking strength was 48 MPa, and the breaking elongation was 217%. Further, the S-S curve in the tensile test was obtained. The pattern was the pattern A shown in FIG. 5.

On the other hand, a polyacrylic adhesive was prepared as a second adhesive layer, and an unstretched polypropylene film having a thickness of 30 μm was prepared as a sealant layer.

Further, as a matte coat layer, a composition for a matte coat layer was prepared by mixing 70 parts by mass of fluoroethylene vinyl ester as a heat-resistant resin, 10 parts by mass of barium sulfate as fine inorganic particles, 10 parts by mass of powdery silica, 5 parts by mass of polytetrafluoroethylene wax as wax, and 5 parts by mass of polyethylene resin beads as resin beads.

A first adhesive layer was formed by applying a predetermined amount of colored adhesive composition to one surface (outer surface) of the aluminum foil for a metal foil layer on which a chemical conversion coating film was formed on both surfaces and drying it. The coating amount of the colored adhesive composition, the number average molecular weight Mn, the weight average molecular weight Mw, the ratio thereof Mw/Mn, and the content (coating amount) of the carbon black were as shown in Table 1B. The substrate layer film was bonded on the first adhesive layer to laminate the substrate layer.

Then, the polyacrylic adhesive as the second adhesive layer was applied to the other surface (lower surface) of the metal foil layer, and the polypropylene film as a sealant layer was bonded to the outer surface thereof.

Further, the matte coat layer composition was applied to the outer surface of the substrate layer such that the thickness after drying became 2 μm.

The laminate bonded as described above was allowed to be aged at 40° C. for 5 days to obtain an exterior material (power storage device packaging material) of Example 1.

Examples 2 to 8 and Comparative Examples 1 to 9

Packaging materials of Examples 2 to 8 and Comparative Examples 1 to 9 were obtained in the same manner as in Example 1 except that in the substrate layer as shown in Tables 1A and 1B, the thickness, the hot water shrinkage, the elastic modulus, the breaking strength, and the number average molecular weight were adjusted, and in the first adhesive layer, the pigment concentration (carbon black density), the colored adhesive composition application quantity, the pigment application quantity (content), the number average molecular weight Mn, and the weight average molecular weight Mw, the ratio thereof Mw/Mn were adjusted.

In the packaging material sample of Example 6, a highly adhesion (surface) treatment agent layer (0.2 g/m$^2$) made of a urethane resin was provided on the corona-treated surface of the polyamide film (substrate layer).

Evaluation Test (1) Evaluation of Concealability (Screening Property)

The packaging materials of Examples and Comparative Examples were each visually observed from the substrate layer side (outer surface side) to confirm the concealability of the metal foil layer. Then, those having a screening property was evaluated as "○," and those having no screening property was evaluated as "X." Evaluation results thus obtained are evaluated in Table 2.

TABLE 2

| | Performance evaluation results | | | | | | |
|---|---|---|---|---|---|---|---|
| | | | | ONY/Al laminate strength immediately | Present or absence of delamination | | |
| | Shealability | Moldability | Puncture strength (N) | after 40° C. hot water immersion (N/15 mm) | High-temperature high-humidity test | Warm water immersion test | Moldability |
| Ex. 1 | ○ | ⊚ | 29.2 ⊚ | 3.6 | ⊚ | ⊚ | ○ |
| Ex. 2 | ○ | ⊚ | 27.1 ⊚ | 2.8 | ⊚ | ○ | ○ |
| Ex. 3 | ○ | ⊚ | 26.3 ⊚ | 3.8 | ⊚ | ⊚ | ○ |
| Ex. 4 | ○ | ⊚ | 25.9 ○ | 4.0 | ⊚ | ⊚ | ○ |
| Ex. 5 | ○ | ⊚ | 25.1 ○ | 4.2 | ⊚ | ⊚ | ○ |
| Ex. 6 | ○ | ⊚ | 24.3 ○ | 2.5 | ⊚ | ○ | ○ |
| Ex. 7 | ○ | ⊚ | 25.6 ○ | 3.3 | ⊚ | ⊚ | ○ |
| Ex. 8 | ○ | ⊚ | 24.3 ○ | 3.8 | ⊚ | ⊚ | ○ |
| Comp. Ex. 1 | X | X | 21.3 X | 4.5 | ⊚ | ⊚ | X |
| Comp. Ex. 2 | X | X | 18.2 X | 4.8 | ⊚ | ⊚ | ○ |
| Comp. Ex. 3 | ○ | X | 20.6 X | 1.7 | ○ | Δ | ○ |
| Comp. Ex. 4 | ○ | X | 20.6 X | 1.5 | X | X | ○ |
| Comp. Ex. 5 | ○ | X | 20.6 X | 0.6 | X | X | ○ |
| Comp. Ex. 6 | ○ | X | 19.8 X | 4.2 | ⊚ | ⊚ | ○ |

TABLE 2-continued

| | | | | ONY/Al laminate strength immediately | Present or absence of delamination | | |
| --- | --- | --- | --- | --- | --- | --- | --- |
| | Shealability | Moldability | Puncture strength (N) | after 40° C. hot water immersion (N/15 mm) | High-temperature high-humidity test | Warm water immersion test | Moldability |
| Comp. Ex. 7 | ○ | X | 18.4 X | 4.2 | ◉ | ◉ | ○ |
| Comp. Ex. 8 | ○ | X | 23.5 Δ | 4.2 | ◉ | ◉ | ○ |
| Comp. Ex. 9 | ○ | X | 20.3 X | 4.2 | ◉ | ◉ | ○ |

(2) Evaluation of Moldability

A press machine manufactured by Amada Co., Ltd. was prepared in which a mold having a punch shape of 33 mm×54 mm, a punch corner R of 2 mm, a punch shoulder R of 1.3 mm, and a die shoulder R of 1 mm of a die shape was prepared.

Then, packaging materials of Examples and Comparative Examples were each sampled into a 100 mm×125 mm blank, and each sample was subjected to deep drawing using a press machine described above to prepare a molded article sample.

The presence or absence of pinholes and/or cracks at the corner portion of each molded article obtained by the deep drawing was confirmed, and the "maximum molding depth (mm)" at which pinholes and cracks did not occur was investigated and evaluated based on the following criteria.

The presence or absence of cracks or pinholes in the evaluation was examined by a light transmittance method in a dark room. Among "◉," "○," and "X" of the evaluation criteria described below, "◉" and "○" denote acceptable (Passed)," and "X" denotes unacceptable (Failed)." The results are shown in Table 2.

Figure 6:
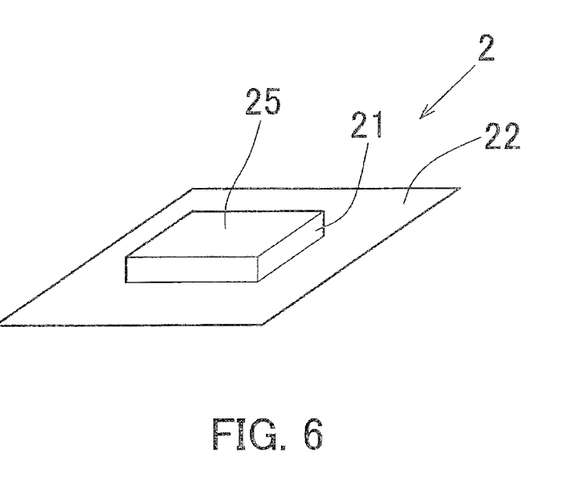
FIG. 6 is a perspective view showing a molded article of a packaging material sample used in the example of the present invention.

◉: There were no cracks or pinholes when the forming depth was 6 mm or more
○: There were no cracks or pinholes when the forming depth was 5 mm and more and less than 6 mm
X: There were cracks or pinholes when the forming depth was less than 5 mm (3) Evaluation on Peeling of Substrate Layer
(3-1) Peeling Strength The packaging materials of Examples and Comparative Examples were each sampled to a predetermined size and subjected to deep drawing in the same manner as described above to prepare a molded article of a molded case (upside-down tray-shaped member) 2 as a molded article having a recessed portion (protrusion) 21 of 33 mm×54 mm×4.5 mm as shown in FIG. 6 and a flat flange portion 22 on the outer periphery of the protrusion. Further, after the top wall (top surface) 25 of the convex portion of the molded article 2 was concavely deformed to be crushed, the crushed molded article 2 was submerged in warm hot water at 40° C. for one week. The molded article thus immersed for one week was taken out from the water, and the lamination strength between the substrate layer and the metal foil layer (ONY/Al lamination strength [N/15 mm]) was measured while the molded article immediately after taken out was in a state where water adhered thereto. The results are shown in Table 2.

(3-2) Presence or Absence of Peeling

In the same manner as in "(3-1) Delamination Strength," a molded case 2 as a molded article was produced. Further, after the top wall (top surface) 25 of the convex portion of the molded article 2 was concavely deformed to be crushed, the following high-temperature and high-humidity test and hot water submersion test were performed, and the presence or absence of delamination of the substrate layer after the test was visually observed.

In the high-temperature and high-humidity test, the molded article 2 having the crushed top surface 25 was stored in an atmosphere of 70° C. and 90% moisture for two weeks, and the presence or absence of peeling of the substrate layer was confirmed. Further, in the hot water submersion test, the crushed molded article 2 was submerged in hot water at 45° C. and stored for two weeks.

For both the tests, 30 pieces of molded articles 2 were visually observed for each Example and for each Comparative Example, and were determined by the following criteria based on the number of molded articles 2 in which the substrate layer was peeled off from the metal foil layer.

Among "◉", "○", "Δ", and "X" in the following criteria, "◉", "○", and "Δ" denote acceptable (Passed), and "X" denotes unacceptable (Failed). The results are shown in Table 2.

◉: There was no molded article in which the substrate layer was peeled off from the metal foil layer out of 30 pieces of molded articles
○: There were 1 or 2 pieces of molded articles in which the substrate layer was peeled off from the metal foil layer out of 30 pieces of molded articles
Δ: There were 3 to 5 pieces of molded articles in which the substrate layer was peeled off from the metal foil layer out of 30 pieces of molded articles
X: There were 6 to 30 pieces of molded articles in which the substrate layer was peeled off from the metal foil layer out of 30 pieces of molded articles (4) Evaluation of Moldability In producing each of the packaging materials of Examples and Comparative Examples, the drying time after applying the first adhesive layer (colored adhesive composition) was measured. At this time, the drying time of Example 5 was used as a reference time, and those whose drying time was slower than the reference time by 15% or more were evaluated as "X: Unacceptable (Failed)," and those other than the above were evaluated as "○: Acceptable (Passed). The results are shown in Table 2.

(5) Measurement of Puncture Strength (Evaluation of Puncture Resistance)

The puncture strength (puncture strength) was measured according to JIS (Japanese Industrial Standard) Z1707:2019. The puncture strength test was measured by the following procedures (5-1) to (5-3).

(5-1) The test piece obtained from the packaging material of each Example and each Comparative Example was fixed with a jig. A semicircular needle having a radius of 1.0 mm and a tip shape radius of 0.5 mm penetrated the test piece at a test speed of 50±5 mm/min, and the maximum force (N) until the needle penetrated was measured.

(5-2) The number of the test pieces was 5 or more in each Example and each Comparative Example, and the test pieces were collected so as to be averaged over the entire width.

(5-3) In a case where the test result depends on whether the needle penetrates from either side of the film, the test was performed on each side. The measured value (reported value) shall be one decimal place. The results are shown in Table 2.

The obtained measurements were evaluated based on the following criteria. Among "⊚," "○," "Δ," and "X" in criteria, "⊚," "○," and "Δ" were determined as acceptable (Passed), and "X" was determined as unacceptable (Failed). The results are shown in Table 2.

⊚: The measured value was 26 N or more to 30 N or less
○: The measured value was 24 N or more and less than 26 N
Δ: The measured value was 22 N or more and less than 24 N
X: The measured value was less than 22 N Overall Evaluation As can be seen from the above evaluation results, the packaging materials of Examples related to the present invention were excellent in shielding property, moldability, peel resistance, moldability, and puncture resistance. In contrast, the packaging materials of Comparative Examples, which were deviated from the gist of the present invention, were inferior to either evaluation as compared with the packaging materials of Examples.

In particular, the following matters are apparent from "(3) Evaluation of Peeling of Substrate Layer." That is, in the packaging material, even if a substrate layer (polyamide film) having a hot water shrinkage rate TD/MD≤1.5 is used, residual stresses remain in the substrate layer after molding, and in a portion (machine direction (MD) or transverse direction (TD)) where the forming strain becomes large depending on the molding dimension, peeling of the substrate layer may occur in a high-temperature and high-humidity hot-water immersion environment.

On the other hand, in the packaging materials of Examples, the application quantity of the colored adhesive layer is adjusted to 5 g/m$^2$ to 10 g/m$^2$, and the pigment application quantity is adjusted to 0.25 g/m$^2$ to 0.49 g/m$^2$. Therefore, it is possible to prevent the occurrence of coating film defects due to aggregated particles of the colored pigments and the occurrence of roughening of the coating film surface. In other words, it is apparent that the packaging material according to the present invention is superior in both moldability and adhesive properties between layers.

INDUSTRIAL APPLICABILITY

The packaging material of the present invention can be suitably used as a packaging material for a battery (power storage device), such as, e.g., a secondary battery (lithium-ion secondary battery) for notebook computers and mobile telephones, and a vehicle-mounted (mobile) or stationary secondary battery.

This application claims priority to Japanese Patent Application No. 2022-65615 filed on Apr. 12, 2022, and Japanese Patent Application No. 2023-36561 filed on Mar. 9, 2023, the disclosure of which is incorporated herein by reference in its entirety.

The terms and expressions used herein are for illustration purposes only and are not used for limited interpretation, do not exclude any equivalents of the features shown and stated herein, and it should be recognized that the present invention allows various modifications within the scope of the present invention as claimed.

DESCRIPTION OF SYMBOLS

1: External material (packaging material)
10: Power storage device main body
2: Tray member (packaging material, external material, packaging container)
3: Cover member (packaging material, external material)
50: Matte coat layer
51: Substrate layer
52: Metal foil layer
53: Sealant layer
61: First adhesive layer (colored adhesive layer)
63: Chemical conversion coating film
MD: Machine direction
TD: Transverse direction

The invention claimed is:

1. A packaging material comprising:
a substrate layer made of a heat-resistant resin;
a metal foil layer laminated on an inner side of the substrate layer;
a sealant layer made of a thermoplastic resin, the sealant layer being laminated on an inner side of the metal foil layer; and
a colored adhesive layer provided between the metal foil layer and the substrate layer,
wherein the substrate layer is 2.0% to 5.0% in a hot water shrinkage both in a machine direction (MD) and in a transverse direction (TD) perpendicular to the machine direction,
wherein the substrate layer is 1.5% or less in a difference between the hot water shrinkage in the machine direction (MD) and the hot water shrinkage in the transverse direction (TD),
wherein the substrate layer is 1.5 GPa to 3 GPa both in an elastic modulus in the machine direction (MD) and in an elastic modulus in the transverse direction (TD),
wherein the colored adhesive layer is composed of a colored adhesive composition containing a color pigment and an adhesive,
wherein the colored adhesive layer is composed of the colored adhesive composition of 5 g/m$^2$ to 10 g/m$^2$, and
wherein the colored adhesive layer contains the color pigment of 0.25 g/m$^2$ to 0.49 g/m$^2$.

2. The packaging material as recited in claim 1,
wherein the colored adhesive layer contains a two-part curing type polyester urethane resin composed of a polyester resin as a main agent and a polyfunctional isocyanate compound as a curing agent,
wherein the polyester resin as the main agent is 8,000 to 25,000 in a number average molecular weight (Mn), 15,000 to 50,000 in a weight average molecular weight (Mw), and 1.3 to 2.5 in a ratio thereof (Mw/Mn),
wherein the polyfunctional isocyanate compound as the curing agent contains 50 mole % or more of aromatic isocyanate, and
wherein the substrate layer is constituted by a polyamide film having a number average molecular weight of 15,000 to 30,000.

3. The packaging material as recited in claim 2,
wherein in the two-part curing type polyester urethane resin, the polyester resin as the main agent is made of dicarboxylic acid and dialcohol as raw materials, and
wherein the dicarboxylic acid includes aliphatic dicarboxylic acid whose methylene number of methylene chain is an even number and aromatic dicarboxylic acid, and a content rate of the aromatic dicarboxylic acid to a total amount of the aliphatic dicarboxylic acid and the aromatic dicarboxylic acid is 40 mole % to 80 mole %.

4. The packaging material as recited in claim 2,
wherein a cured film of the two-part curing type polyester urethane resin is 70 MPa to 400 MPa in a Young's modulus by a tensile test according to JIS K7162.

5. The packaging material as recited in claim 1,
wherein the metal foil layer has a chemical conversion coating film on at least one surface thereof.

6. The packaging material as recited in claim 1, further comprising:
a matte coat layer provided on an outer surface of the substrate layer.

7. The packaging material as recited in claim 1,
wherein the substrate layer is 320 MPa or more in at least one of breaking strength in the machine direction (MD) and breaking strength in the transverse direction (TD).

8. A packaging container comprising:
the packaging material as recited in claim 1,
wherein the packaging material includes a molded portion formed by deep drawing or stretch forming.

9. A power storage device packaging material formed of the packaging material as recited in claim 1.

10. A power storage device comprising:
a power storage device main body; and
the packaging material as recited in claim 9,
wherein the power storage device main body is packaged with the packaging material.

* * * * *